(12) United States Patent
Gelman et al.

(10) Patent No.: US 11,137,822 B2
(45) Date of Patent: Oct. 5, 2021

(54) METHOD AND APPARATUS FOR IMPROVING INTEGRITY OF PROCESSOR VOLTAGE SUPPLY WITH OVERSHOOT MITIGATION AND SUPPORT FOR DVFS

(71) Applicant: Chaoyang Semiconductor Jiangyin Technology Co., Ltd., Jiangyin (CN)

(72) Inventors: Anatoly Gelman, San Diego, CA (US); Taner Dosluoglu, New York, NY (US)

(73) Assignee: Chaoyang Semiconductor Jiangyin Technology Co., Ltd., Jiangyin (CN)

( * ) Notice: Subject to any disclaimer, the term of this patent is extended or adjusted under 35 U.S.C. 154(b) by 254 days.

(21) Appl. No.: 16/286,138

(22) Filed: Feb. 26, 2019

(65) Prior Publication Data

US 2019/0265779 A1    Aug. 29, 2019

Related U.S. Application Data

(60) Provisional application No. 62/635,327, filed on Feb. 26, 2018.

(51) Int. Cl.
*G06F 1/3296* (2019.01)
*G06F 1/12* (2006.01)
*G06F 1/28* (2006.01)
*G06F 1/08* (2006.01)
*G06F 1/324* (2019.01)

(52) U.S. Cl.
CPC .............. *G06F 1/3296* (2013.01); *G06F 1/08* (2013.01); *G06F 1/12* (2013.01); *G06F 1/28* (2013.01); *G06F 1/324* (2013.01)

(58) Field of Classification Search
CPC ................. G06F 1/32; G06F 1/26; G06F 1/12
See application file for complete search history.

(56) References Cited

U.S. PATENT DOCUMENTS

| | | | |
|---|---|---|---|
| 6,356,063 B1 * | 3/2002 | Brooks | H02M 3/156 323/284 |
| 6,414,538 B1 * | 7/2002 | Bosnyak | G05F 3/205 327/540 |
| 6,608,787 B1 * | 8/2003 | Daga | G11C 7/067 365/203 |
| 8,164,391 B2 * | 4/2012 | Huynh | H03L 7/0893 331/34 |
| 8,169,802 B2 * | 5/2012 | Kim | H02M 3/33523 363/49 |

(Continued)

FOREIGN PATENT DOCUMENTS

WO    WO 2014-166537 A1    10/2014

OTHER PUBLICATIONS

International Search Report on related PCT Application No. PCT/US2019/019646 from International Searching Authority (KIPO) dated Jul. 2, 2019.

(Continued)

*Primary Examiner* — Phil K Nguyen
(74) *Attorney, Agent, or Firm* — Klein, O'Neill & Singh, LLP

(57) ABSTRACT

Circuitry may monitor a processor supply voltage and pull power from the processor supply on a temporary basis when the supply voltage rises above predetermined levels. In some embodiments this may be done without explicit knowledge of a commanded supply voltage level for the processor.

10 Claims, 20 Drawing Sheets

(56) References Cited

U.S. PATENT DOCUMENTS

| | | | |
|---|---|---|---|
| 8,242,762 B2* | 8/2012 | Bhagwat | H02M 3/1588 |
| | | | 323/282 |
| 9,806,617 B1* | 10/2017 | Ozawa | H03K 3/02337 |
| 2009/0091378 A1 | 4/2009 | Haridass et al. | |
| 2010/0121897 A1 | 5/2010 | Bal et al. | |
| 2013/0154601 A1* | 6/2013 | Snowdon | G05F 1/571 |
| | | | 323/311 |
| 2014/0218001 A1* | 8/2014 | Dally | H02M 1/00 |
| | | | 323/285 |
| 2016/0352219 A1 | 12/2016 | Amgad Abdulslam et al. | |
| 2017/0085256 A1* | 3/2017 | Nomiyama | H03K 19/20 |
| 2017/0261537 A1* | 9/2017 | Chong | G01R 31/3004 |
| 2017/0374720 A1* | 12/2017 | Ho | H02M 3/156 |

OTHER PUBLICATIONS

Written Opinion on related PCT Application No. PCT/US2019/019646 from International Searching Authority (KIPO) dated Jul. 2, 2019.

* cited by examiner

| SENSOR | CONDITION AND OUTPUT INDICATION |
|---|---|
| Overshoot sensor #0 | Vin > Vovr0: OVERSHOOT THRESHOLD #0 TRIP |
| | Vin < Vovr0: OVERSHOOT THRESHOLD #0 NO-TRIP |
| | Vin close to Vovr0: OVERSHOOT THRESHOLD #0 TRIP or NO-TRIP |
| Overshoot sensor #1 | Vin > Vovr1: OVERSHOOT THRESHOLD #1 TRIP |
| | Vin < Vovr1: OVERSHOOT THRESHOLD #1 NO-TRIP |
| | Vin close to Vovr1: OVERSHOOT THRESHOLD #1 TRIP or NO-TRIP |
| Overshoot sensor #m | Vin > Vovrm: OVERSHOOT THRESHOLD #m TRIP |
| | Vin < Vovrm: OVERSHOOT THRESHOLD #m NO-TRIP |
| | Vin close to Vovrm: OVERSHOOT THRESHOLD #m TRIP or NO-TRIP |

FIG. 9

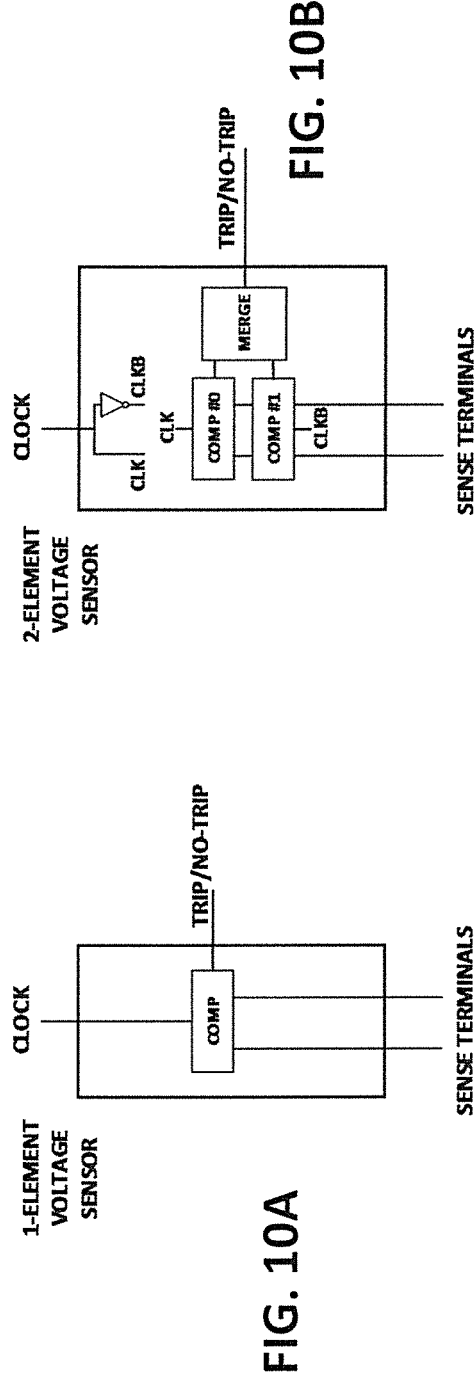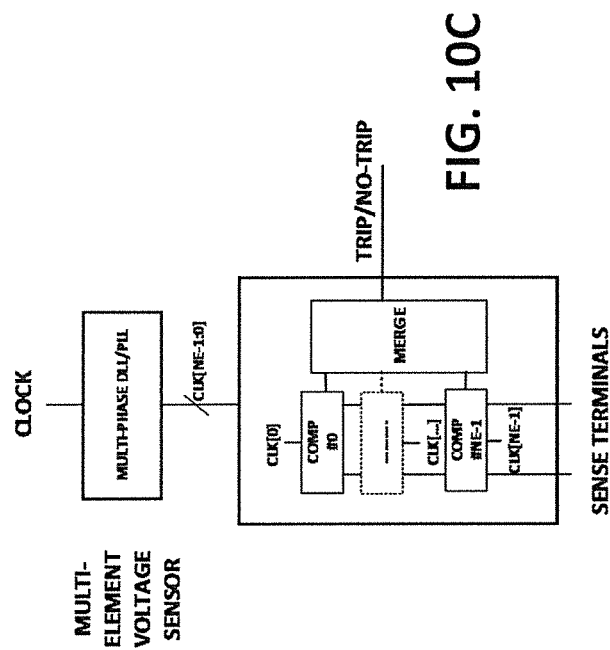
FIG. 10A
FIG. 10B
FIG. 10C

METHOD AND APPARATUS FOR IMPROVING INTEGRITY OF PROCESSOR VOLTAGE SUPPLY WITH OVERSHOOT MITIGATION AND SUPPORT FOR DVFS

CROSS REFERENCE TO RELATED APPLICATION

This application claims the benefit of the filing date of U.S. Provisional Patent Application No. 62/635,327, filed on Feb. 26, 2018, the disclosure of which is incorporated by reference herein.

BACKGROUND OF THE INVENTION

Aspects of the invention relate to voltage regulation for semiconductor devices, and more particularly to mitigating voltage overshoots in a regulated voltage supply for semiconductor devices.

Reliable continuous operation of a high-performance processor, for example a CPU or GPU, often depends on integrity of a voltage supply to the processor. For example, during a sudden decrease in a processor's operational activity (which may be referred to as load negative step transient, load negative step event, or transient event), the supply voltage may temporarily overshoot a desired voltage. Often processors are designed to withstand transient voltage overshoot events by adding extra circuitry for additional hold-time closure margin, to attempt to ensure reliable continuous operation of the processor at its chosen operating frequency.

An active transient control block may be used to reduce voltage overshoots. An overshoot suppression feature of an active transient control block generally includes circuitry for providing alternate path(s) to ground on the occurrence of a negative transient change in supplied voltage. Use of an active transient control block may relax transient-related voltage margin requirements for processor design, thus effectively providing a useful voltage credit which can be used to increase a processor's operating frequency, and/or reduce a processor's power consumption, and/or increase manufacturing yield at higher operating frequency, and/or reduce Processor's silicon area.

In some cases the voltage levels may be set statically, for example depending on a system in which the processor is configured to operate. In some cases the voltage levels instead or in addition may be dynamically changed during operation, for example due to dynamic voltage and frequency scaling (DVFS) operations. In either case, circuitry preconfigured to account for transient voltage overshoots may have difficulties in being able to properly respond in the case of differing desired voltage level of the processor.

BRIEF SUMMARY OF THE INVENTION

Some embodiments provide an apparatus and/or method for mitigation of supply voltage overshoots. Some embodiments provide voltage overshoot responses with sub-nanosecond response times. Some embodiments provide for automatic transient control responses without predetermined knowledge of a processor's voltage target. In some embodiments an active transient control block is agnostic to a processor's voltage target. In some embodiments the active transient control block is independent of DVFS implementations and/or commands.

These and other aspects of the invention are more fully comprehended upon review of this disclosure.

BRIEF DESCRIPTION OF THE FIGURES

FIG. 9 is a table indicating example output settings for overshoot sensors in accordance with aspects of the invention.

FIGS. 10A-C illustrate embodiments of voltage sensors in accordance with aspects of the invention.

DETAILED DESCRIPTION

Figure 1:
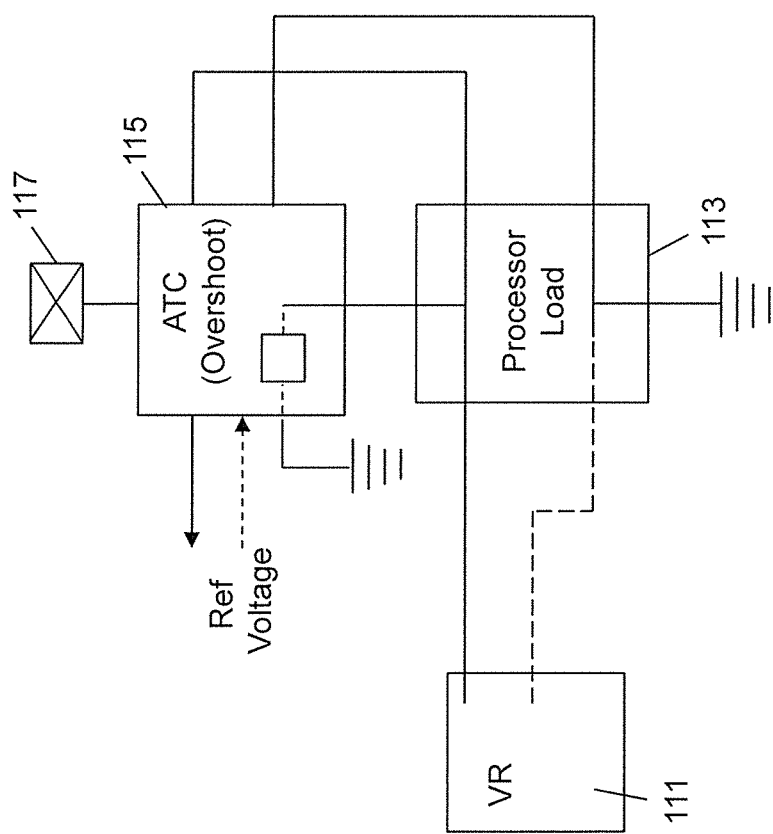
FIG. 1 is a block diagram of a voltage regulation system for a load including an active transient control (ATC) block in accordance with aspects of the invention.

FIG. 1 is a block diagram of a voltage regulation system for a load including an active transient control (ATC) block in accordance with aspects of the invention. In the embodiment of FIG. 1, a voltage regulator 111 provides power to a processor load 113. In most embodiments the load comprises semiconductor circuitry, and may be for example a processor, processor core, CPU cluster or other semiconductor logic circuitry. The voltage regulator may be, for example, a DC-DC switching converter, and the voltage regulator may be in a buck configuration, a boost configuration, a buck-boost configuration, or some other configuration. In some embodiments the semiconductor circuitry is that of a handheld device, for example a smartphone, with the voltage regulator regulating power provided by a battery. To conserve battery power, and for other reasons, in various embodiments a desired voltage level for the load may vary dynamically, for example as determined and commanded from time-to-time by a dynamic voltage and frequency scaling block (not shown).

Power drawn by the load may also vary substantially over time, depending on activity of the processor(s) making up the load. Moreover, the power drawn by the load may decrease very quickly, over very few clock cycles. In such instances, the voltage provided to the load by the voltage regulator may suddenly increase, or exhibit a voltage overshoot, that may result in improper operation of the load.

Accordingly, the system of FIG. 1 includes an ATC block 115. The ATC block is coupled to a power source 117. As illustrated in FIG. 1, the ATC block is coupled to the load in parallel with the voltage regulator. The ATC block monitors for occurrence of a voltage overshoot, and pulls power from that being provided to the load by the power source in the event of a voltage overshoot. (In some embodiments the ATC block may also include droop mitigation circuitry, for example as discussed in "METHOD AND APPARATUS FOR IMPROVING INTEGRITY OF PROCESSOR VOLTAGE SUPPLY WITH SUPPORT FOR DVFS," Attorney Docket No. 1495-029.001, of the same inventors as herein, and filed on even date herewith, the disclosure of which is incorporated by reference herein.) In some embodiments the ATC block receives a reference voltage signal for use in determining occurrence of a voltage overshoot. In some embodiments the ATC block of FIG. 1 does so without being provided the reference voltage signal, and in various embodiments the ATC block does so without being provided a signal indicative of a commanded voltage level for power supplied to the load.

Figure 2:
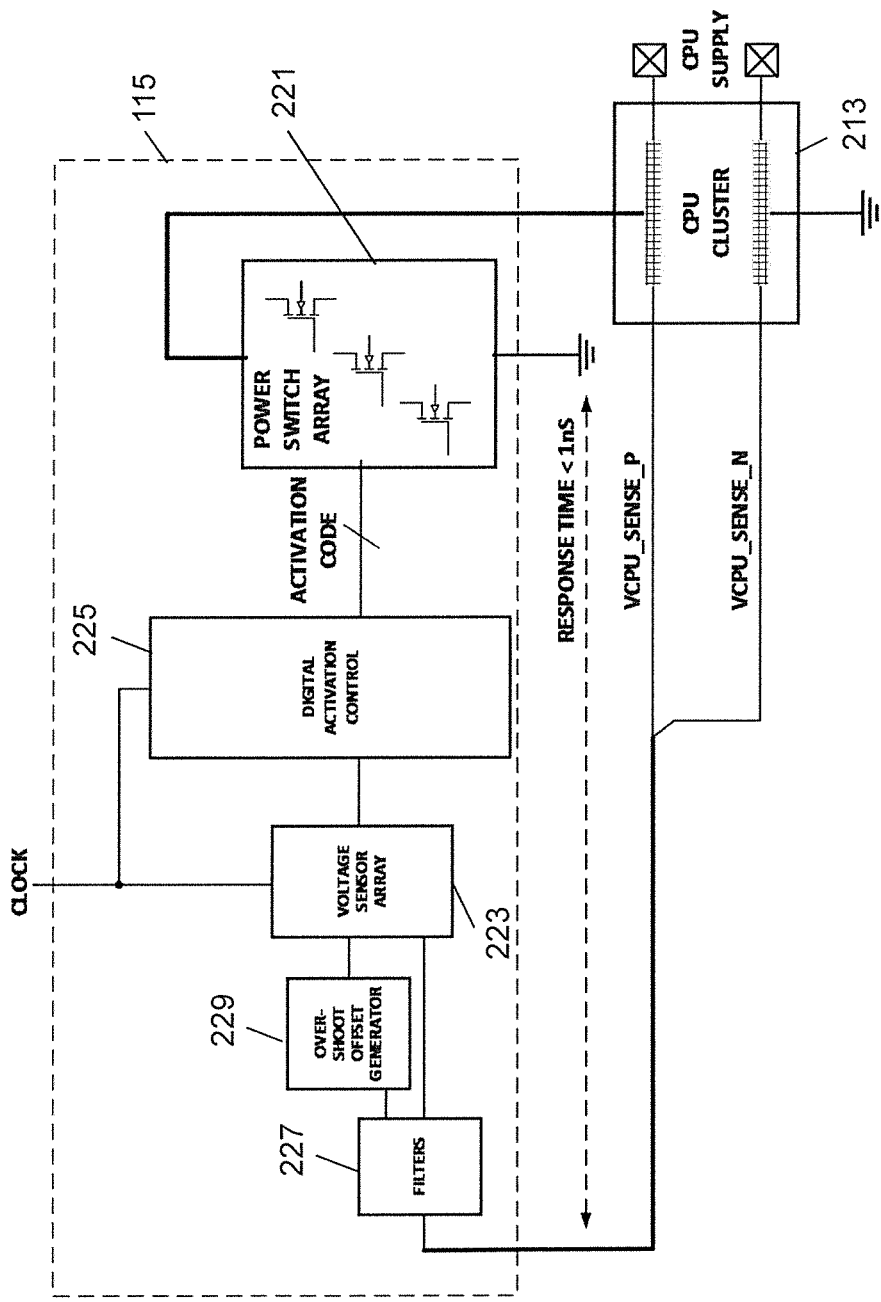
FIG. 2 is a block diagram of an embodiment of an ATC block coupled to a load, in accordance with aspects of the invention.

FIG. 2 is a block diagram of an embodiment of an ATC block 115 coupled to a load, in accordance with aspects of the invention. The ATC block receives sense signals indicating voltage of power rails of the load, with the load being shown as a CPU cluster. In some embodiments, and as illustrated in FIG. 2, the power rails include a lower level voltage rail at ground, and a higher level voltage rail above ground. In some embodiments the ATC block is coupled directly to the power rails, in some embodiments the ATC block receives signals at a voltage equal to the voltage levels of the rails, or a scaled version of the voltage levels of the rails.

Low-pass filters 227 of the ATC block receive the sense signals indicating voltage levels of the rails. The low-pass filters provide voltage signals to an overshoot offset generator 229 and a voltage sensor array 223. In various embodiments the low-pass filters serve to provide a delay, programmable in some embodiments, to the voltage signals provided to the overshoot offset generator and the voltage sensor array. In some embodiments the voltage signal to the overshoot offset generator is delayed by an amount greater than the voltage signal to the voltage sensor array. In some embodiments only one low-pass filter is used, for the signal to be provided to the overshoot offset generator.

The overshoot offset generator generates one or more voltage levels believed to be indicative of overshoot detection thresholds. The overshoot offset generator generates the voltage levels based on the voltage signal provided by the low-pass filters. In some embodiments the one or more voltage levels believed to be indicative of overshoot detection thresholds are fixed percentages of the voltage signal provided by the low-pass filters. In some embodiments the one or more voltage levels believed to be indicative of overshoot detection thresholds are programmable percentages of the voltage signal provided by the low-pass filters.

The voltage sensor array compares the voltage signal from the low-pass filters with the one or more voltage levels believed to be indicative of overshoot detection thresholds. As indicated above, in some embodiments the voltage signal provided to the overshoot offset generator is delayed for a greater amount of time than the voltage signal provided to the voltage sensor array. Accordingly, even though the low-pass filters provide signals to both the overshoot offset generator and the voltage sensor array, in such embodiments a rise in voltage of power supplied to the CPU cluster will be exhibited as a rise in voltage in the voltage signal provided to the voltage sensor array prior to a corresponding increase in output of the overshoot offset generator. The voltage sensor array, therefore, determines if voltage supplied to the load exhibits a rise in voltage above the voltage levels believed to be indicative of voltage overshoot.

Results of the comparisons performed by the voltage sensor array are provided to a digital activation control block 225, which may also be termed at times as a digital control block. The digital activation control block generates an activation code based on the results of the comparisons performed by the voltage sensor array. In some embodiments the activation code is provided by the digital activation control block on a plurality of signal paths, for example with one bit of the activation code provided on each of the plurality of signal paths.

A power switch array 221 receives the digital activation code. Based on the digital activation code the power switch array activates none, one or a plurality of switches to pull power, provided to the CPU cluster by a power supply, to ground. In some embodiments the power switch array includes a plurality of switches in parallel coupling the CPU cluster high power rail to ground. In some embodiments different ones of the paths are configured to pull different amounts of power from the CPU cluster. In some embodiments each of the paths are configured to pull the same amount of power from the CPU cluster. In some embodiments the power switch array is as discussed in U.S. Pat. No. 9,515,553, the disclosure of which is incorporated herein in its entirety. In some embodiments the power switches are implemented in banks of power switches, and the different banks of power switches may be located in different areas of a semiconductor. For example, in some embodiments one bank of power switches may be located on one side of circuitry for the overshoot offset generator, voltage sensors, and digital control, and one bank of power switches may be located on an opposing side of the circuitry for the overshoot offset generator, voltage sensors, and digital control. In some embodiments each of the power switches share a same trimming code.

Figure 3A:
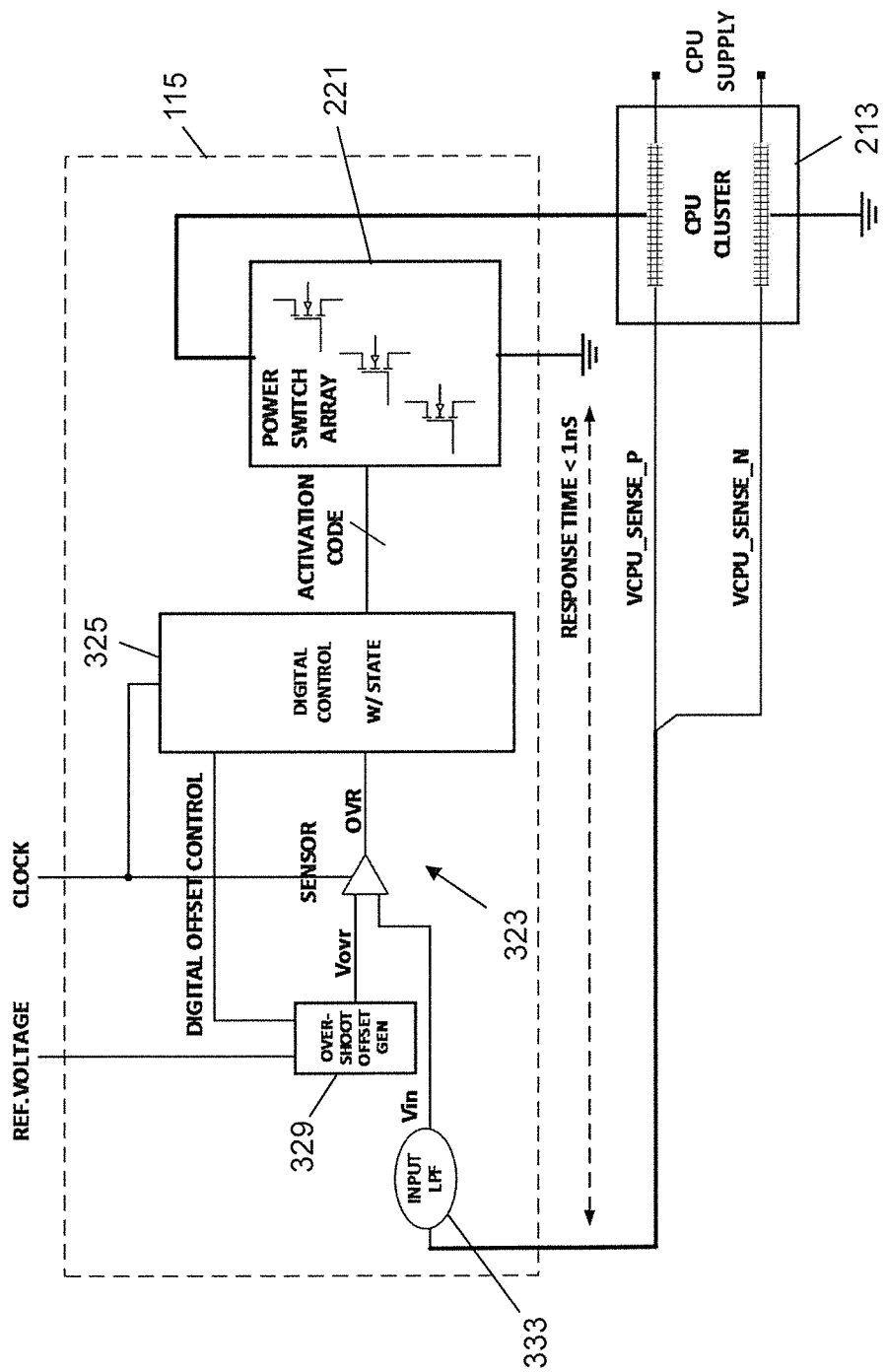
FIG. 3A is a block diagram of a further embodiment of an ATC block coupled to a load, in accordance with aspects of the invention, with the further embodiment showing an example including a low-pass filter and a single voltage sensor array.

FIG. 3A is a block diagram of a further embodiment of an ATC block coupled to a load, in accordance with aspects of the invention, with the further embodiment showing an example of an input low-pass filter and the voltage sensor array of the ATC block of FIG. 2. The embodiment of FIG. 3A, like the embodiment of FIG. 2, shows a CPU cluster 213 with a power rail coupled to an ATC block 115. A power switch array 221 of the ATC block couples the power rail of the CPU cluster to ground.

An overshoot offset generator 329 generates a voltage overshoot threshold signal Vovr. The signal Vovr is based on a reference voltage signal. In some embodiments the reference voltage signal is a signal at a voltage higher than a voltage commanded to be supplied to the CPU cluster. In some embodiments the overshoot threshold signal Vovr may be set to a predetermined percentage of the reference voltage signal. In some embodiments the reference voltage is provided by reference power supply circuitry. In some such embodiments the reference power supply circuitry may comprise an external low dropout (LDO) regulator, and/or bandgap voltage source. The LDO regulator and/or bandgap voltage source may, for example, receive power from a power supply source other than the regulated voltage supply, and in many embodiments the LDO regulator may receive power from the same power source providing power to the DC-DC switching converter providing the regulated voltage supply to the CPU cluster. In some such embodiments, the LDO regulator may set the reference voltage at a level determined by a digital-to-analog converter (DAC), allowing for system setting of a desired reference voltage. In some embodiments, and as illustrated in FIG. 3A, the overshoot threshold signal Vovr is set based on the reference voltage signal and a digital offset control signal, provided by the digital control 325.

The ATC block of the embodiment of FIG. 3A includes an input low-pass filter 333. The input low-pass filter provides a filtered voltage signal Vin, which is compared to the Vovr signal by voltage sensors 323.

In some embodiments the input low-pass filter is implemented using an RC circuit. In some embodiments the input low-pass filter has a programmable time constant. In some embodiments the time constant of the input low-pass filter is between 0-0.5 nanoseconds. In one embodiment the time constant of the input low-pass filter is 0.2 nanoseconds.

Results of the comparison by the voltage sensor is provided to the digital control 325. The digital control sets an activation code commanding a number of switches of the power switch array to activate. In some embodiments the digital control sets the activation code to increase the number of active power switches, up to all of the power switches, for each clock cycle, or each of a number of programmable clock cycles, for a voltage overshoot situation, in which the voltage sensors indicate that the Vin signal is greater than the Vovr signal. In some embodiments the digital control sets the activation code to decrease the number of active power switches, up to all of the power switches, for each clock cycle, or each of a number of programmable clock cycles, for a no voltage overshoot situation in which the voltage sensors indicate that the Vin signal is not greater than the Vovr signal.

In some embodiments, and as illustrated in FIG. 3A, the digital control sets the digital offset control signal, used by the overshoot offset generator in setting the overshoot threshold signal Vovr. In some embodiments the digital control sets the digital offset control signal to command use of a higher value for Vovr, up to a predefined maximum value, for each cycle an overshoot situation exists. In some embodiments, the digital control offset signal is reset to command use of a minimum value for Vovr, or simply a lower value, when the overshoot situation no longer exists.

Figure 3B:
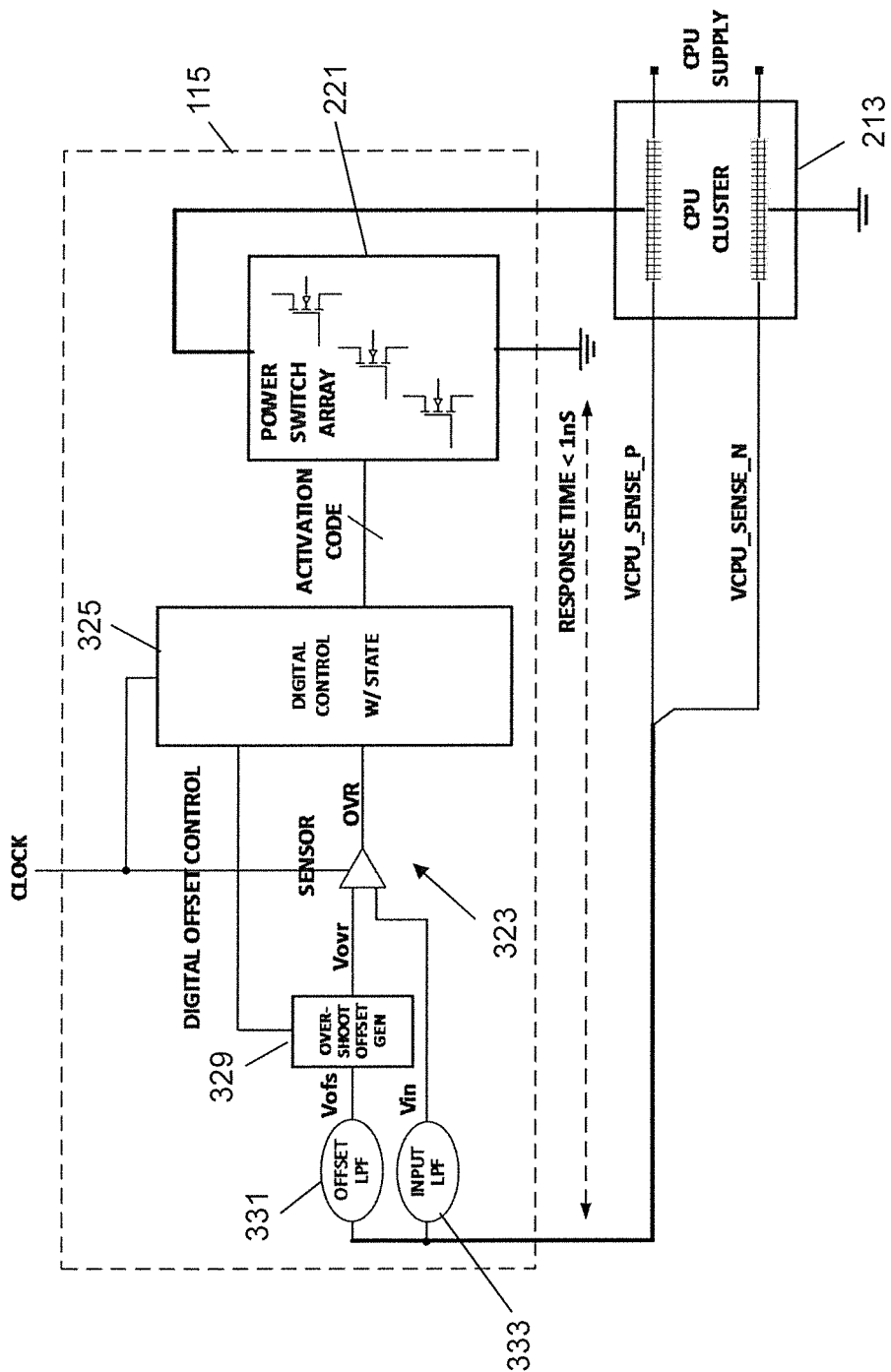
FIG. 3B is a block diagram of a further embodiment of an ATC block coupled to a load, in accordance with aspects of the invention, with the further embodiment showing an example including a low-pass filter and a single voltage sensor array, without reliance on external reference voltage.

FIG. 3B is a block diagram of a further embodiment of an ATC block coupled to a load, in accordance with aspects of the invention. The embodiment of FIG. 3B is similar to the embodiment of FIG. 3A, with the ATC block 115 coupled to the CPU cluster 213 and ground as in FIG. 3A. The embodiment of FIG. 3B also has an input low-pass filter 333, voltage sensors 323, digital control 325, and power switch array 221 as discussed with respect to FIG. 3A.

Unlike the embodiment of FIG. 3A, the embodiment of FIG. 3B does not use the reference voltage signal to determine the voltage overshoot threshold signal Vovr. Instead, the embodiment of FIG. 3B uses a filtered, or delayed, version of the voltage supplied to the CPU cluster to generate the voltage overshoot threshold signal Vovr. In the embodiment of FIG. 3B the filtering is performed by an offset low-pass filter 331.

The offset low-pass filter provides a filtered voltage signal Vofs to the overshoot offset generator 329, with the overshoot offset generator generating the overshoot signal Vovr. In some embodiments the time constant of the offset low-pass filter is between 10-100 nanoseconds. In some embodiments the time constant of the offset low-pass filter is 20 nanoseconds. In various such embodiments, the time constant of the input low-pass filter may be as discussed with respect to the embodiment of FIG. 3A. In some embodiments the time constant of the input low-pass filter is less than the time constant of the offset low-pass filter. With the time constant of the input low-pass filter less than that of the offset low-pass filter, the output of the input low-pass filter will lead that of the output low-pass filter. As the output of the offset low-pass filter is used in generating Vovr, the voltage sensors effectively compare the output of the input low-pass filter with a scaled and delayed version of itself.

Figure 4A:
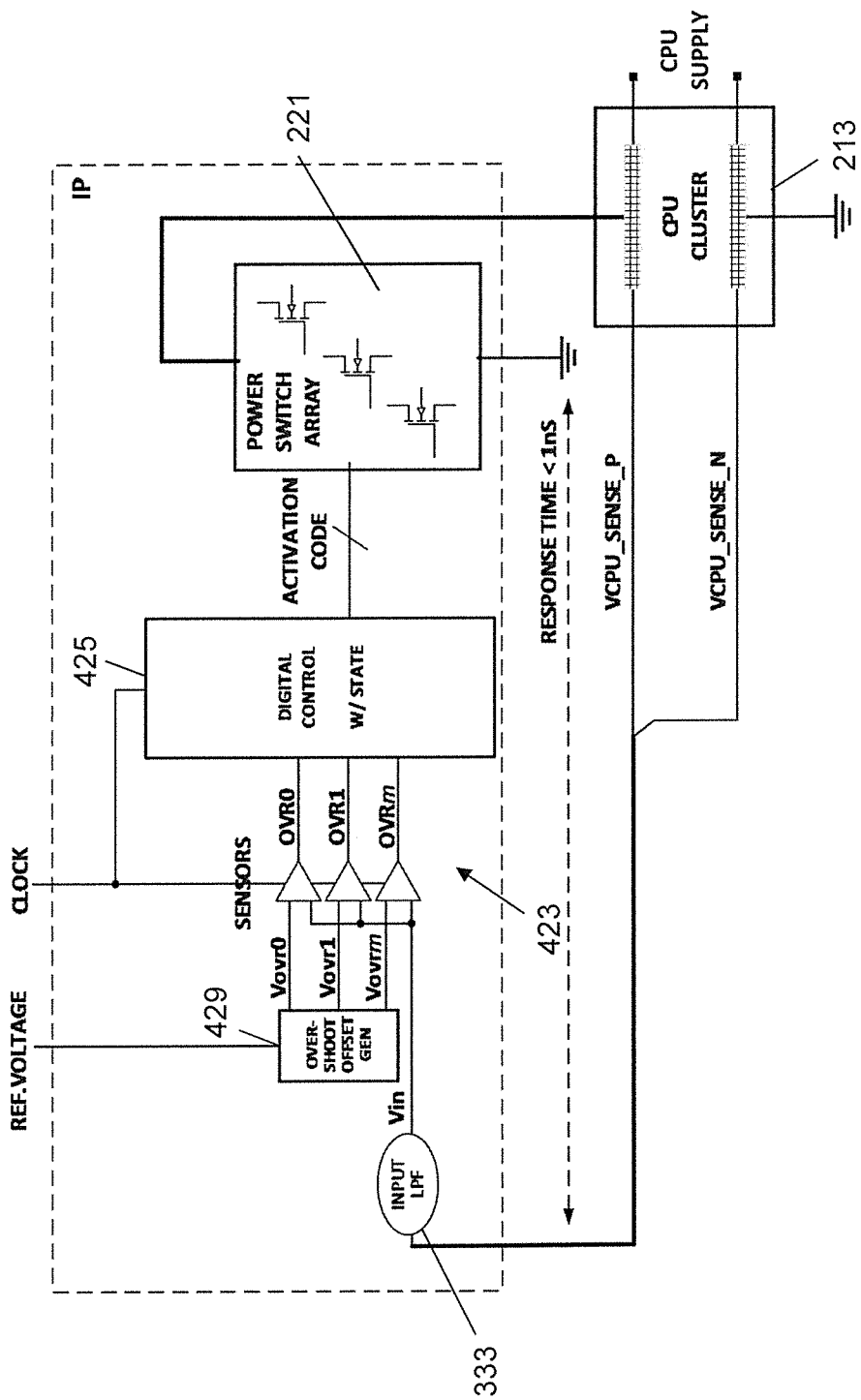
FIG. 4A is a block diagram of a further embodiment of an ATC block coupled to a load, in accordance with aspects of the invention, with the further embodiment showing an example of a voltage sensor array of the ATC block of FIG. 2.

FIG. 4A is a block diagram of a further embodiment of an ATC block coupled to a load, in accordance with aspects of the invention, with the further embodiment showing a further example of the voltage sensor array of the ATC block of FIG. 2. The embodiment of FIG. 4A is similar to the embodiment of FIG. 3A, with the embodiment of FIG. 4A including a plurality of overshoot voltage thresholds, a plurality of voltage sensors 423, and a plurality of voltage overshoot indicators. The use of a greater number of overshoot indicators may provide for increased flexibility in responding to voltage overshoot situations, although the use of additional numbers of voltage sensors to do so may result in an increase in area of and power usage by the voltage sensors.

The embodiment of FIG. 4A, like the embodiment of FIG. 2, shows a CPU cluster 213 with a power rail coupled to an ATC block. A power switch array 221 of the ATC block couples the power rail of the CPU cluster to ground. Like the embodiment of FIG. 3A, the embodiment of FIG. 4A includes an input low-pass filter 333, for example as discussed with respect to FIG. 3A.

An overshoot offset generator 429 of FIG. 4A, however, generates a plurality of overshoot threshold signals Vovr0, Vovr1, Vovrn. As with the embodiment of FIG. 3A, the overshoot signals are set based on a reference voltage input provided to the overshoot offset generator. Each of the plurality of overshoot signals are at different voltage levels, with for example Vovr0 being a higher voltage than Vovr1, which is higher than Vovr2, etc. Similarly, the voltage sensors compare Vin, from the input low-pass filter, with each of the overshoot signals.

A digital control 425 sets an activation code for activating switches of the power switch array. In some embodiments the digital control sets the activation code based on the number of voltage sensors 423 indicating an overshoot condition. In some embodiments the digital control sets the activation code as discussed with respect to the embodiment of FIG. 3A and additionally the number of voltage sensors indicating an overshoot condition. For example, in some embodiments the digital control sets the activation code to activate a percentage of power switches based on a percentage of voltage sensors indicating an overshoot condition.

Figure 4B:
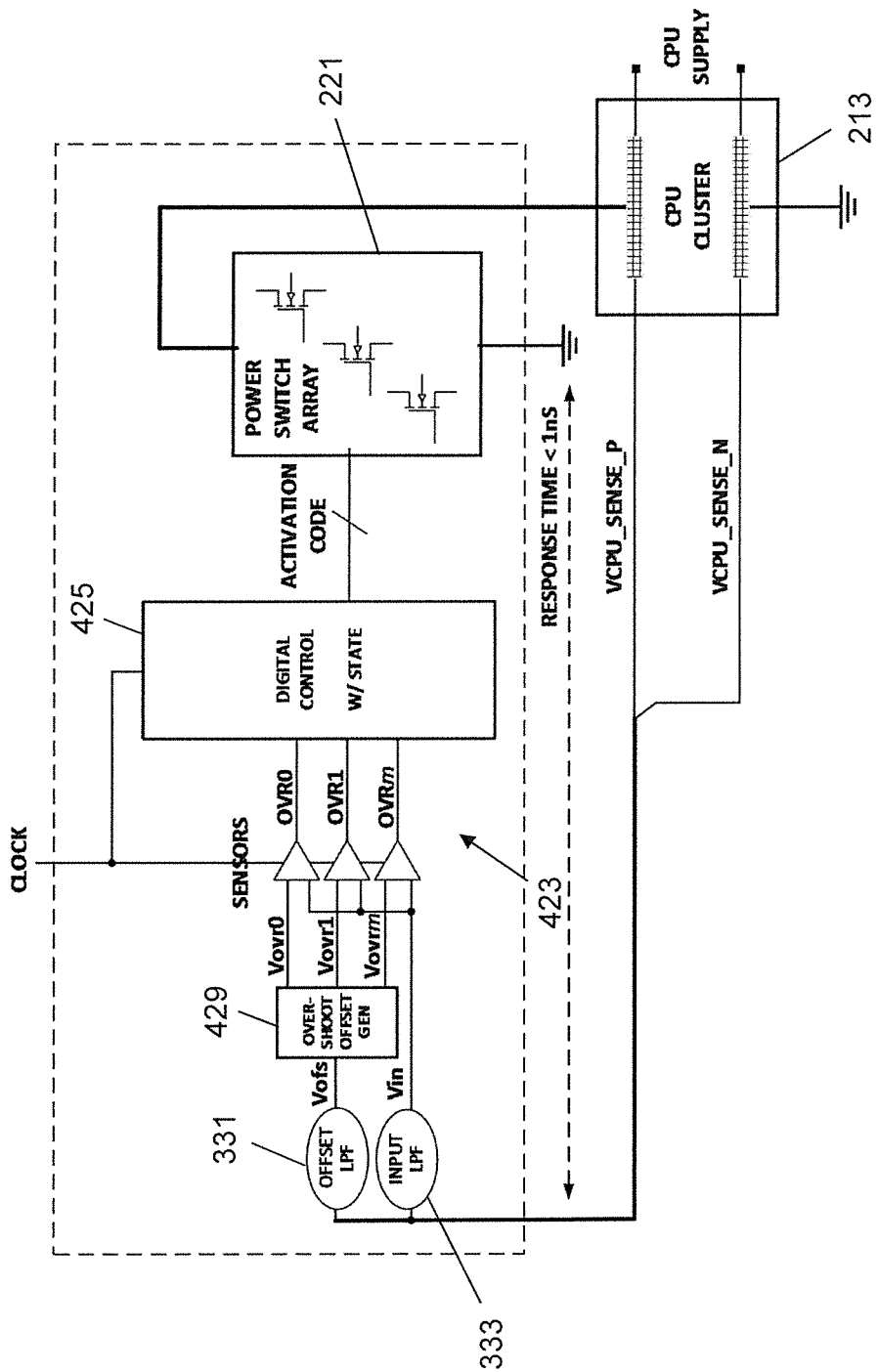
FIG. 4B is a block diagram of a further embodiment of an ATC block coupled to a load, in accordance with aspects of the invention, with the further embodiment showing an example of a voltage sensor array of the ATC block of FIG. 2, without reliance on external reference voltage.

FIG. 4B is a block diagram of a further embodiment of an ATC block coupled to a load. The ATC block of FIG. 4B is the same as that of FIG. 4A, with the exception that the embodiment of FIG. 4B utilizes a Vofs signal to generate the overshoot threshold signals, instead of the reference voltage signal. The Vofs signal is generated using an offset low-pass filter 331, as discussed with respect to the embodiment of FIG. 3B.

Figure 5A:
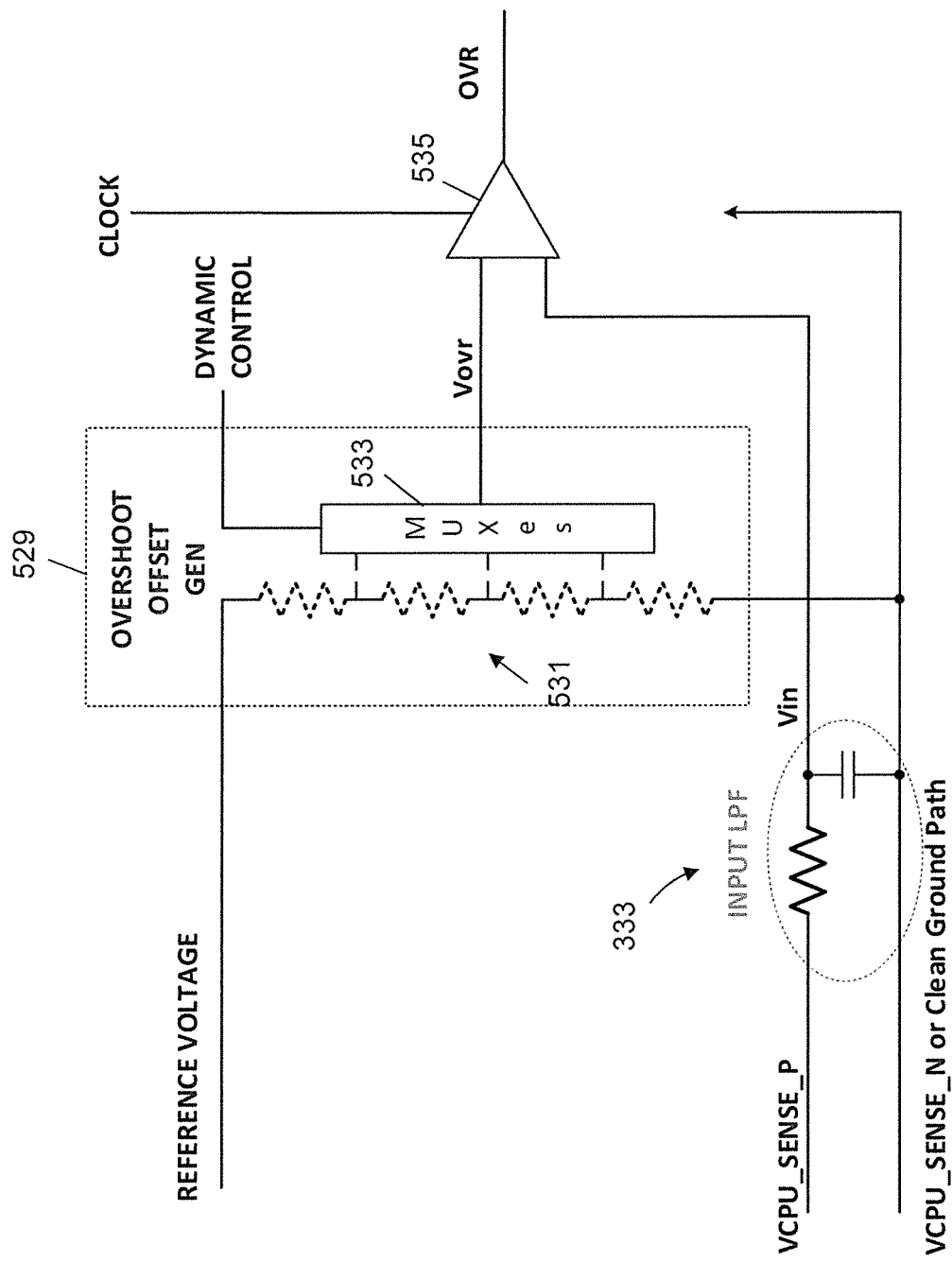
FIG. 5A is a semi-schematic semi-block diagram of example low-pass filters, overshoot offset generator, and single voltage sensor for an ATC block, in accordance with aspects of the invention.

FIG. 5A is a semi-schematic semi-block diagram of an example input low-pass filter, overshoot offset generator, and single voltage sensor for an ATC block, in accordance with aspects of the invention. In FIG. 5A an input low-pass filter 333 is shown. The input low-pass filter is shown as an RC circuit. An input to the RC circuit is coupled to a CPU high power rail (or signal line indicative of voltage of the CPU high power rail) and the capacitor of the RC circuit is coupled to the CPU low power rail (or signal line indicative of voltage of the CPU low power rail), which might be ground (and is discussed as ground generally herein).

An overshoot offset generator 529 receives a reference voltage as its input. The reference voltage may be the reference voltage signal as discussed with respect to FIG. 3A, for example. The overshoot offset generator couples this input to a voltage divider 531, illustrated as a series of resistors coupled to ground. For illustrative purposes, the overshoot offset generator of FIG. 5A only outputs one Vovr signal. The Vovr signal is a voltage from the voltage divider selected by a multiplexer 533, with the selected voltage provided as a Vovr signal to a voltage sensor 535 for comparison with the output of the input low-pass filter. In the embodiment of FIG. 5A, the voltage selected is dynamically selected as determined, for example, by a digital control, for example the digital control of FIGS. 2-4B. The digital control may determine the selection based on, for example, a frequency of occurrence of voltage overshoots, an indication of a maximum voltage for which a CPU of a CPU cluster has been designed to operate without logic errors, or other factors. In some embodiments the digital control sets the digital offset control signal to command use of a higher value for Vovr, up to a predefined maximum value, for each cycle an overshoot situation exists. In some embodiments, the digital control offset signal is reset to command use of a minimum value for Vovr, or simply a lower value, when the overshoot situation no longer exists.

Figure 5B:
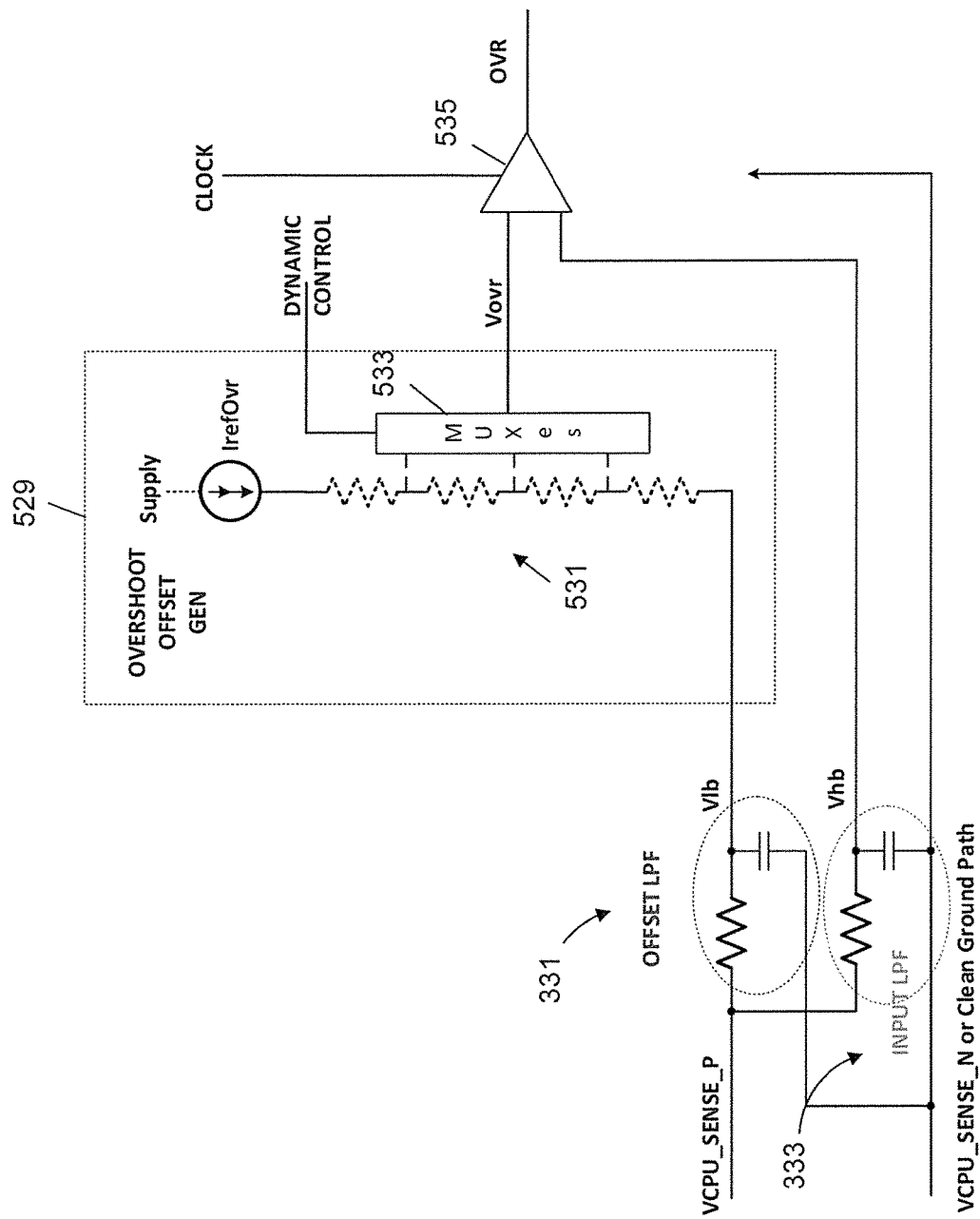
FIG. 5B is a semi-schematic semi-block diagram of example low-pass filters, overshoot offset generator, and single voltage sensor for an ATC block, in accordance with aspects of the invention.

FIG. 5B is also a semi-schematic semi-block diagram of example low-pass filters, overshoot offset generator, and single voltage sensor for an ATC block, in accordance with aspects of the invention. The embodiment of FIG. 5B is similar to that of FIG. 5A, but the embodiment of FIG. 5B uses a constant current source as an input to the overshoot offset generator, instead of the reference voltage, and couples the series of resistors forming the voltage divider to an output of the offset low-pass filter, instead of to ground.

Figure 6A:
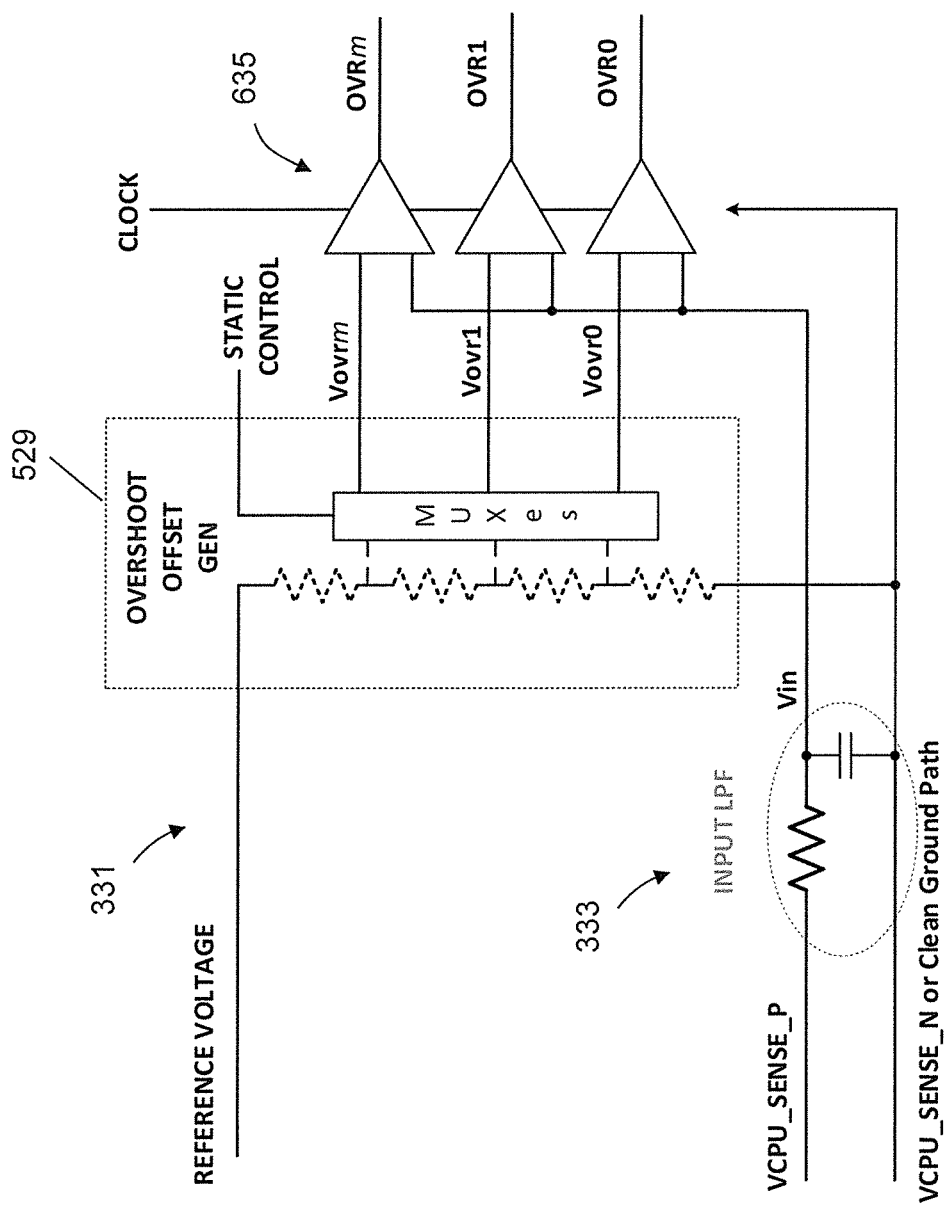
FIG. 6A is a semi-schematic semi-block diagram of a further example low-pass filters, overshoot offset generator, and voltage sensor array for an ATC block, in accordance with aspects of the invention.

FIG. 6A is a semi-schematic semi-block diagram of a further example low-pass filter, overshoot offset generator, and voltage sensor array for an ATC block, in accordance with aspects of the invention. The embodiment of FIG. 6A is similar to that of FIG. 5A, with the input low-pass filter 333, and an overshoot offset generator 529. The overshoot offset generator 529 of the embodiment of FIG. 6A, however, provides a plurality of overshoot detection thresholds, and correspondingly includes a plurality of voltage sensors 635 for comparing overshoot detection thresholds with an output of the input low-pass filter. In addition, the multiplexer of the embodiment of FIG. 6A is shown as being statically controlled.

Figure 6B:
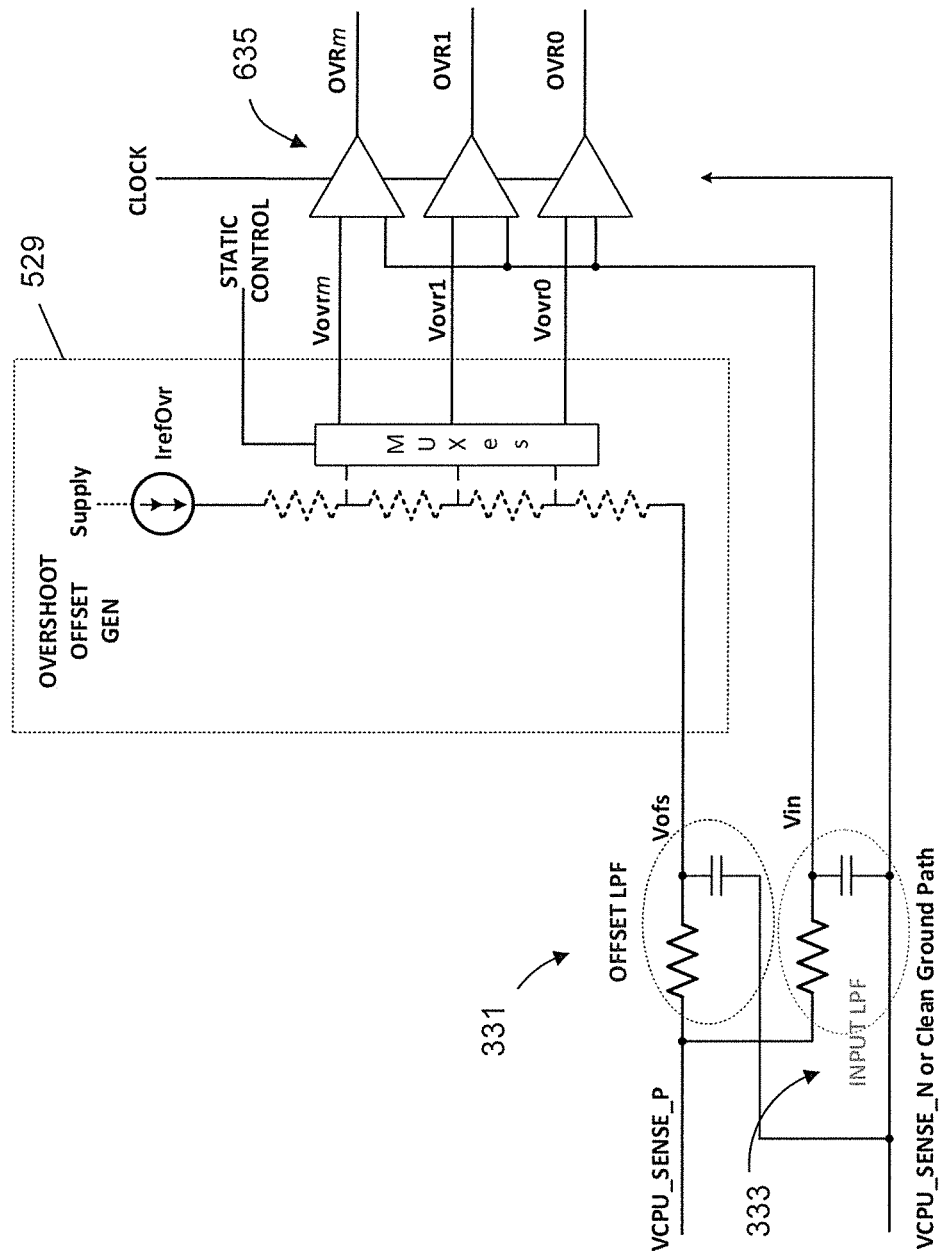
FIG. 6B is a semi-schematic semi-block diagram of a further example low-pass filters, overshoot offset generator, and voltage sensor array for an ATC block, in accordance with aspects of the invention.

FIG. 6B is also a semi-schematic semi-block diagram of example low-pass filters, overshoot offset generator, and single voltage sensor for an ATC block, in accordance with aspects of the invention. The embodiment of FIG. 6B is similar to that of FIG. 5B, in having an overshoot offset generator generating a plurality of overshoot detection thresholds and correspondingly including a plurality of voltage sensors 635. The embodiment of FIG. 6B is also similar to the of FIG. 5B, in using a constant current source to the voltage divider, and having the voltage divider also coupled to an output of the offset low-pass filter.

Figure 7A:
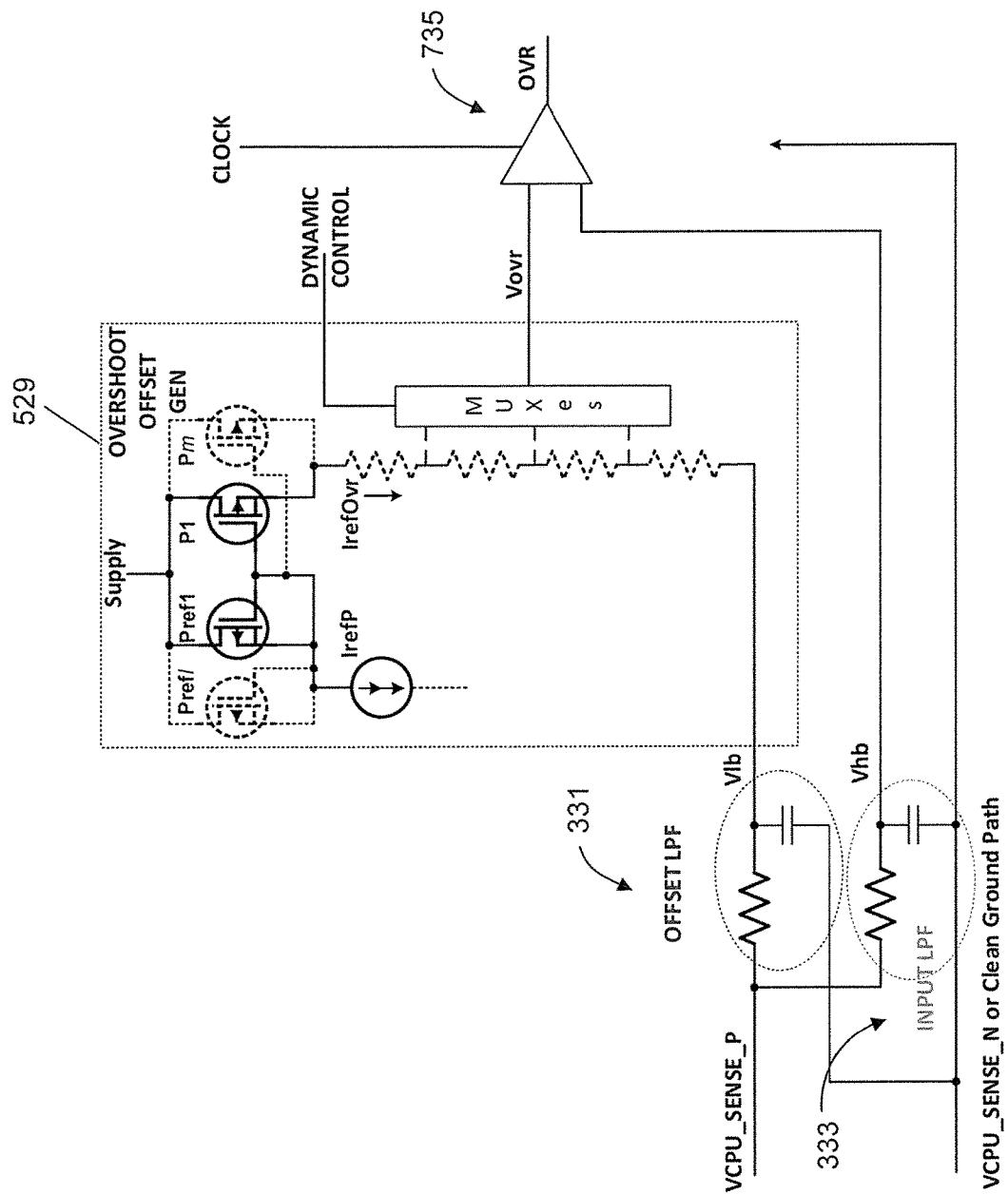
FIG. 7A is a semi-schematic semi-block diagram of an example low-pass filters, overshoot offset generator with current bias, and a single voltage sensor for an ATC block, in accordance with aspects of the invention.

FIG. 7A is a semi-schematic semi-block diagram of an example low-pass filters, overshoot offset generator with current bias, and a single voltage sensor for an ATC block, in accordance with aspects of the invention. The embodiment of FIG. 7A is the same as that of FIG. 5B, except the overshoot offset generator 1129 of the embodiment of FIG. 7A utilizes a current mirror 1151 to provide a bias current for the voltage divider 1131, which it is noted may be implemented with either transistors or resistors for the resistances of the voltage divider.

Figure 7B:
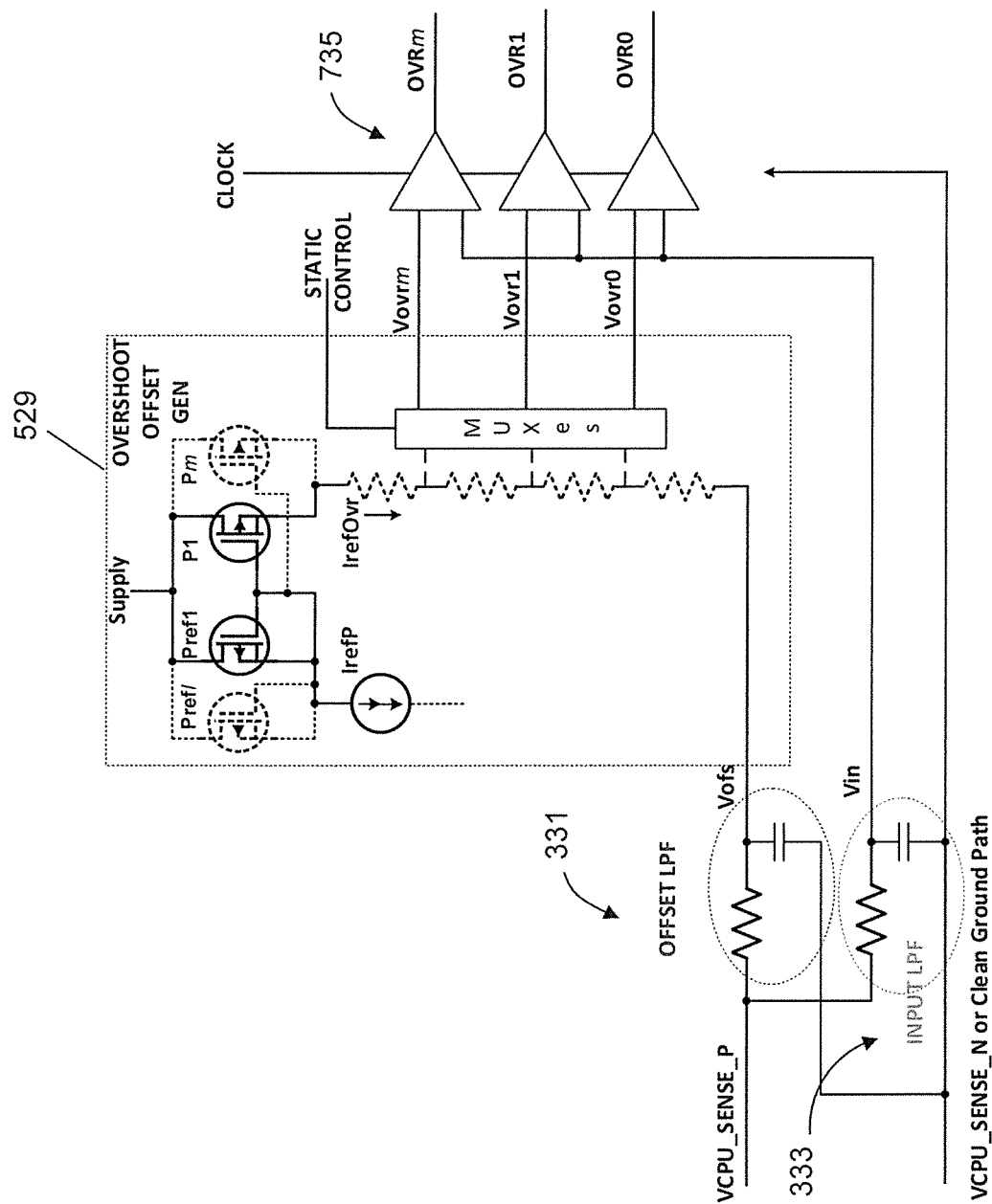
FIG. 7B is a semi-schematic semi-block diagram of a further example low-pass filters, overshoot offset generator with current bias, and a voltage sensor array for an ATC block, in accordance with aspects of the invention.

Similarly, FIG. 7B is also semi-schematic semi-block diagram of a further example low-pass filters, overshoot offset generator with current bias, and a voltage sensor array for an ATC block, in accordance with aspects of the invention. The embodiment of FIG. 7B corresponds to that of FIG. 6B, with the overshoot offset generator 1229 of FIG. 7B making use of the current mirror discussed with respect to FIG. 7A.

Figure 8:
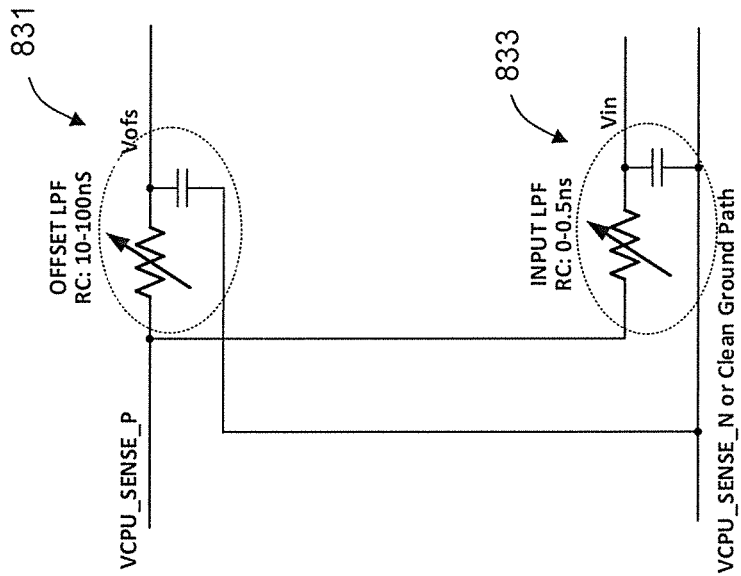
FIG. 8 is a schematic illustrating example low-pass filters for use in an ATC block in accordance with aspects of the invention.

FIG. 8 is a schematic illustrating example low-pass filters for use in an ATC block in accordance with aspects of the invention. The embodiment of FIG. 8 shows an offset low-pass filter 831 and an input low-pass filter 833. Each of the filters are implemented as RC circuits, with a variable resistance. In the embodiments illustrated in FIG. 8, a time constant of the offset low-pass filter may be varied between 10 and 100 nS and a time constant of the input low-pass filter may be varied between 0 and 0.5 nS. Accordingly, an output of the offset low-pass filter will be effectively delayed compared to an output of the input low-pass filter.

FIG. 9 is a table indicating example output settings for overshoot sensors in accordance with aspects of the invention. In some embodiments. As indicated in the table of FIG. 9, overshoot sensors may indicate a trip condition based on comparisons of Vin, which may be the output of the input low-pass filter if present or an indication of voltage supplied to the CPU cluster if not present, with different overshoot threshold levels. In general, a trip, or activate condition, is indicated if Vin rises above the corresponding ones of the overshoot threshold voltages provided to the voltage sensors. In various embodiments the ATC blocks discussed herein may utilize the table of FIG. 9 in determining operations of their digital control blocks.

FIGS. 10A-C illustrate embodiments of voltage sensors in accordance with aspects of the invention. The embodiment of FIG. 10A includes a clocked comparator that outputs a result of a comparison of two inputs on a clocked basis. The embodiment of FIG. 10B includes two clocked comparators that outputs a result of a comparison of two inputs on a clocked basis, with the two comparators clocked using out of phase clock signals. Outputs of the two comparators are merged to provide a result of the comparisons. In some embodiments the merging operation is an OR operation, in some embodiments an AND operation, and in some embodiments an exclusive OR operation. More than two comparators may instead be used. For example, the embodiment of FIG. 10C includes n comparators, n greater than 2, with each of the n comparators clocked from different phases of a clock signal. The different phases of the clock signal may be provided, for example, by a multiphase PLL or DLL.

Figure 11:
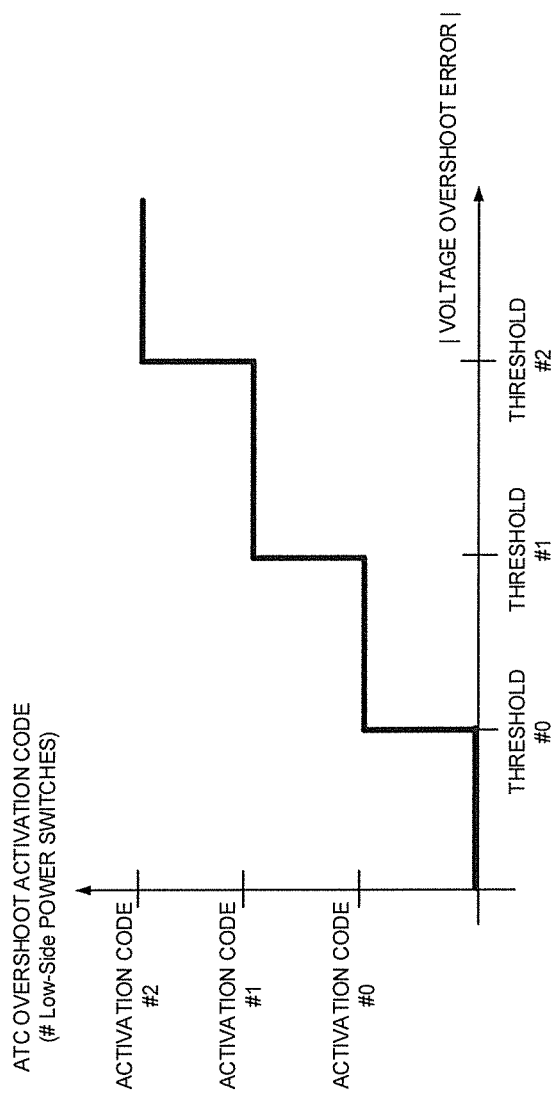
FIG. 11 is an example graph of activation of power switches and voltage overshoot error, in accordance with aspects of the invention.
Figure 15:
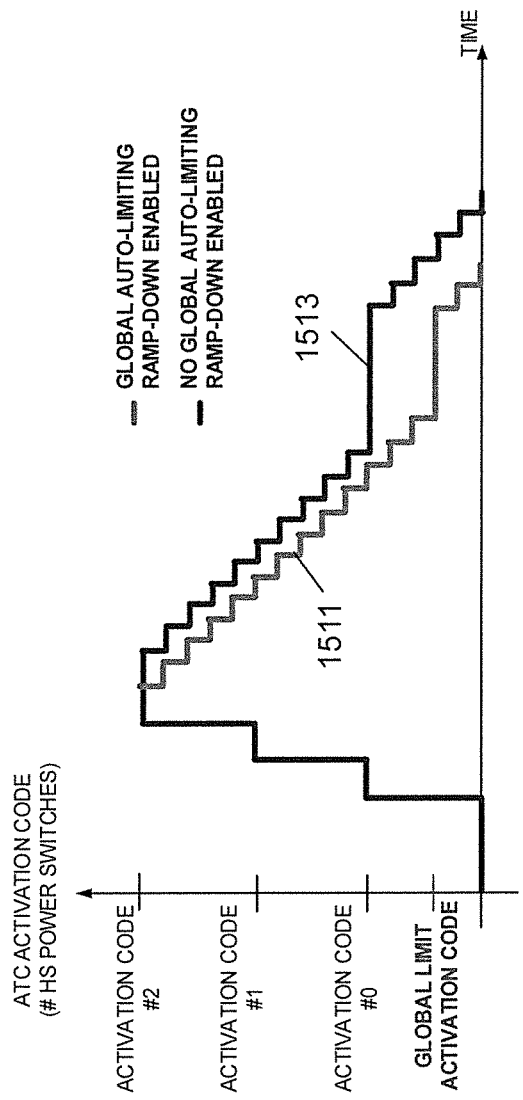
FIG. 15 is a further example graph of activation and ramped-down deactivation feature of power switches with a global auto-limiting feature over time upon a single full-magnitude overshoot event, in accordance with aspects of the invention.

FIG. 11 is a graph of activation of power switches upon detection of voltage overshoot error, in accordance with aspects of the invention. The activation of power switches as indicated by FIG. 15 may be performed by the ATC blocks discussed herein. In FIG. 15, additional power switches are activated as a threshold is reached for each voltage overshoot level. In some embodiments a different activation code is provided for each voltage overshoot level, and the activation code may have a one-to-one correspondence with a number of power switches to be activated. For example, in some embodiments there may be three voltage overshoot levels, three corresponding activation codes, with each activation code activating different numbers of power switches. In some such embodiments the number of power switches activated may be a percentage of the power switches corresponding to the percentage of voltage overshoot levels for which the threshold has been exceeded.

Figure 12:
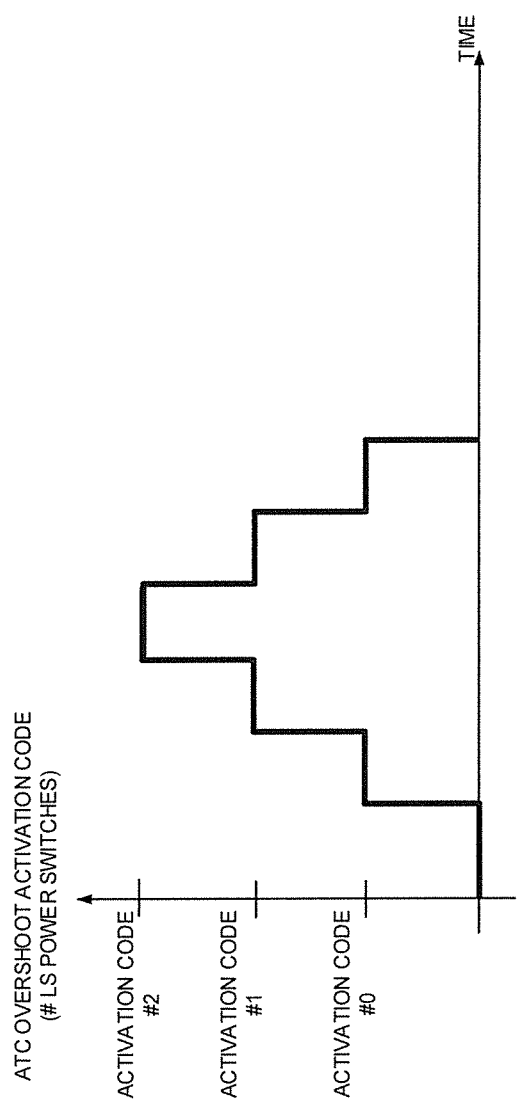
FIG. 12 is a further example graph of activation and ramped-down deactivation feature of power switches over time upon a single full-magnitude overshoot event, in accordance with aspects of the invention.

FIG. 12 is a further graph of activation and deactivation of power switches upon detection of a voltage overshoot event, in accordance with aspects of the invention. The activation and deactivation of power switches as indicated by FIG. 12 may be performed by the ATC blocks discussed herein. The graph of FIG. 12 is similar to that of FIG. 11, but additionally shows reducing the activation code (and hence the number of power switches activated) as Vin decreases and trip signals for voltage overshoot levels are deactivated. In FIG. 12, as each trip signal is deactivated, the activation code is decreased in a manner opposite to that of increase of the activation code, as discussed with respect to FIG. 11.

Figure 13:
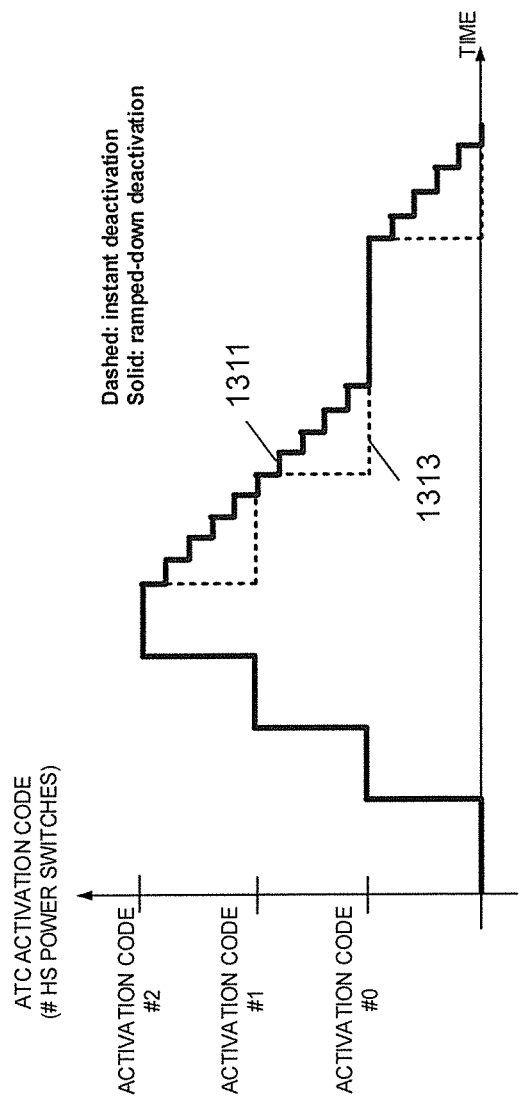
FIG. 13 is a further example graph of activation and ramped-down deactivation feature of power switches over time upon a single full-magnitude overshoot event, in accordance with aspects of the invention.

FIG. 13 is a further graph of activation and ramped-down deactivation feature of power switches upon detection of a voltage overshoot event, in accordance with aspects of the invention. In some embodiments it may be desirable to reduce a rate at which the power switches are deactivated, and FIG. 13 illustrates an example method of doing so. For FIG. 13, a plurality of power switches are associated with each increase or decrease in the activation code (or alternatively, the power switches each have a plurality of different possible states for passing different amounts of power). In FIG. 13, upon a reduction in the activation code, power switches are deactivated over time in a ramping manner, as illustrated by a solid line 1311, instead of deactivating all of the power switches for an activation code all at once, as illustrated by a dashed line 1313. As illustrated in FIG. 13, after a reduction of two levels of the activation code, the activation code is held for a period of time before the continuing reduction of the activation code for so long as a voltage overshoot notification is active, for example in some embodiments an OVR signal in context of FIG. 4A.

Figure 14:
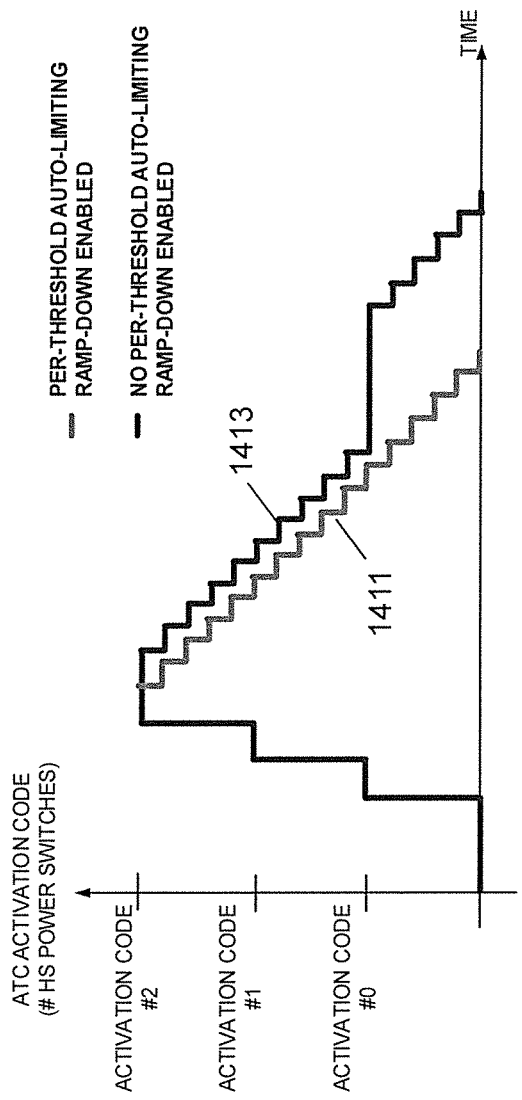
FIG. 14 is a further example graph of activation and ramped-down deactivation feature of power switches with a per-threshold auto-limiting feature over time upon a single full-magnitude overshoot event, in accordance with aspects of the invention.

FIG. 14 is a further graph of activation and ramped-down deactivation feature of power switches with a per-threshold auto-limiting feature upon a voltage overshoot event, in accordance with aspects of the invention. In some embodiments it may be desirable to limit a maximum consecutive time that power switches may be activated, or a maximum consecutive time that a predetermined number of power switches may be activated, or a maximum consecutive time that a particular number of power switches may be activated. In some embodiments the maximum time may be software configurable, and this may be done on a per level basis in some embodiments. In the example of FIG. 14, a maximum consecutive time that power switches may be activated is limited, and ramping down of activation of power switches begins at that time, regardless of the state of the comparisons with the voltage overshoot levels. FIG. 14 shows the ramping down 1411 of the switches based on the maximum consecutive time period being reached, along with the ramping down that would have otherwise occurred 1413 using the example of FIG. 13.

FIG. 15 is a further graph of activation and ramped-down deactivation feature of power switches with a global auto-limiting feature upon a voltage overshoot event, in accordance with aspects of the invention. In some embodiments in which the per-threshold auto-limiting feature is utilized, it may be beneficial to retain some power switches in an active state, even if the maximum consecutive time limit has been reached, so long as one voltage overshoot level trip signal remains active. FIG. 15 indicates this (with a first line 1511), with a ramping down of activation of power switches stopped at what FIG. 15 terms a Global Limit Activation Code, and a ramping down without such a feature shown for comparison purposes by a second line 1513.

Although the invention has been discussed with respect to various embodiments, it should be recognized that the invention comprises the novel and non-obvious claims supported by this disclosure.

What is claimed is:

1. Circuitry for compensating for voltage overshoot in power supplied to a load, comprising:
   a first low pass filter with a first time constant configured to filter a signal indicative of voltage provided to the load to provide a first low pass filtered signal;
   an offset generator configured to generate at least one voltage level indicative of a voltage overshoot threshold;
   a first sensor configured to determine that the first low pass filtered signal is greater than the at least one voltage level; and
   control circuitry configured to activate at least one switch coupling the load to ground in response to the first sensor determining that the first low pass filtered signal is greater than the at least one voltage level;
   wherein the offset generator is configured to generate the at least one voltage level using a reference signal; and
   further comprising a second low pass filter with a second time constant, the second time constant greater than the first time constant, the second low pass filter configured to filter the signal indicative of voltage provided to the load to provide a second low pass filtered signal; and wherein the offset generator is configured to generate the at least one voltage level using the second low pass filtered signal and the reference signal.

2. The circuitry of claim 1, wherein the reference signal is a reference current.

3. The circuitry of claim 2, wherein the reference current is a constant current.

4. The circuitry of claim 1, wherein the first time constant is 100 times the second time constant, and the third time constant is 10 times the second time constant.

5. The circuitry of claim 1, wherein each of the first low pass filter and second low pass filter include a variable resistance.

6. Circuitry for compensating for voltage overshoot in power supplied to a load, comprising:
- a first low pass filter with a first time constant configured to filter a signal indicative of voltage provided to the load to provide a first low pass filtered signal;
- an offset generator configured to generate at least one voltage level indicative of a voltage overshoot threshold;
- a first sensor configured to determine that the first low pass filtered signal is greater than the at least one voltage level; and
- control circuitry configured to activate at least one switch coupling the load to ground in response to the first sensor determining that the first low pass filtered signal is greater than the at least one voltage level;
- wherein the offset generator is configured to generate additional voltage levels; and
- further comprising additional sensors, each configured to determine that the first low pass filtered signal is less than a corresponding one of the additional voltage levels; and
- wherein the at least one switch coupling the higher voltage source supply to the load comprises a plurality of switches; and
- wherein the control circuitry is configured to activate a number of the switches based on a number of the first sensor and additional sensors determining that the first low pass filtered signal is less than the at least one voltage level or the additional voltage levels; and
- wherein the control circuitry is configured to activate at least some of the switches for at most a predetermined maximum consecutive time.

7. A method of compensating for voltage overshoot in power supplied to a load, comprising:
- low pass filtering a signal indicative of voltage supplied to the load, using a first low pass filter having a first time constant, to provide a first low pass filtered signal;
- generating at least one voltage level indicative of a voltage overshoot threshold;
- determining that the first low pass filtered signal is greater than at least one voltage level;
- in response to determining that the first low pass filtered signal is greater than the at least one voltage level, coupling a higher level voltage rail providing power to the load to ground;
- wherein generating the at least one voltage level indicative of the voltage overshoot threshold comprises generating the at least one voltage level using a reference signal; and
- further comprising low pass filtering the signal indicative of voltage supplied to the load, using a second low pass filter, the second low pass filter having a second time constant, the second time constant greater than the first time constant, to provide a second low pass filtered signal; and
- wherein generating the at least one voltage level indicative of the voltage overshoot threshold comprises generating the at least one voltage level using the reference signal and the second low pass filtered signal.

8. The method of claim 7, wherein the reference signal is a reference current.

9. The method of claim 8, wherein the reference current is a constant current.

10. A method of compensating for voltage overshoot in power supplied to a load, comprising:
- low pass filtering a signal indicative of voltage supplied to the load, using a first low pass filter having a first time constant, to provide a first low pass filtered signal;
- generating at least one voltage level indicative of a voltage overshoot threshold;
- determining that the first low pass filtered signal is greater than at least one voltage level; and
- in response to determining that the first low pass filtered signal is greater than the at least one voltage level, coupling a higher level voltage rail providing power to the load to ground;
- wherein the at least one voltage indicative of the voltage overshoot threshold level comprises a plurality of voltages indicative of a plurality of voltage overshoot threshold levels, and wherein an extent of coupling of the higher level voltage rail to ground is based on a number of instances for which the for which the first low pass filtered signal is greater than various ones of the plurality of voltages indicative of the plurality of voltage overshoot threshold levels;
- further comprising generating an activation code based on the number of instances for which the first low pass filtered signal is greater than various ones of the voltages indicative of the plurality of voltage overshoot threshold levels; and
- wherein switches are used to couple the higher level voltage rail to ground; and
- wherein the activation code is used in activating the switches coupling the higher level voltage rail to ground;
- wherein the activation code is also used in deactivating the switches coupling the higher level voltage rail to ground;
- wherein the switches are deactivated over time in a ramping manner; and
- wherein at least some of the switches are only activated for a predetermined maximum consecutive time.

* * * * *